May 12, 1942. L. S. ADAMS 2,282,921
AIRCRAFT PICK-UP AND DELIVERY APPARATUS
Filed Nov. 12, 1938 3 Sheets-Sheet 3
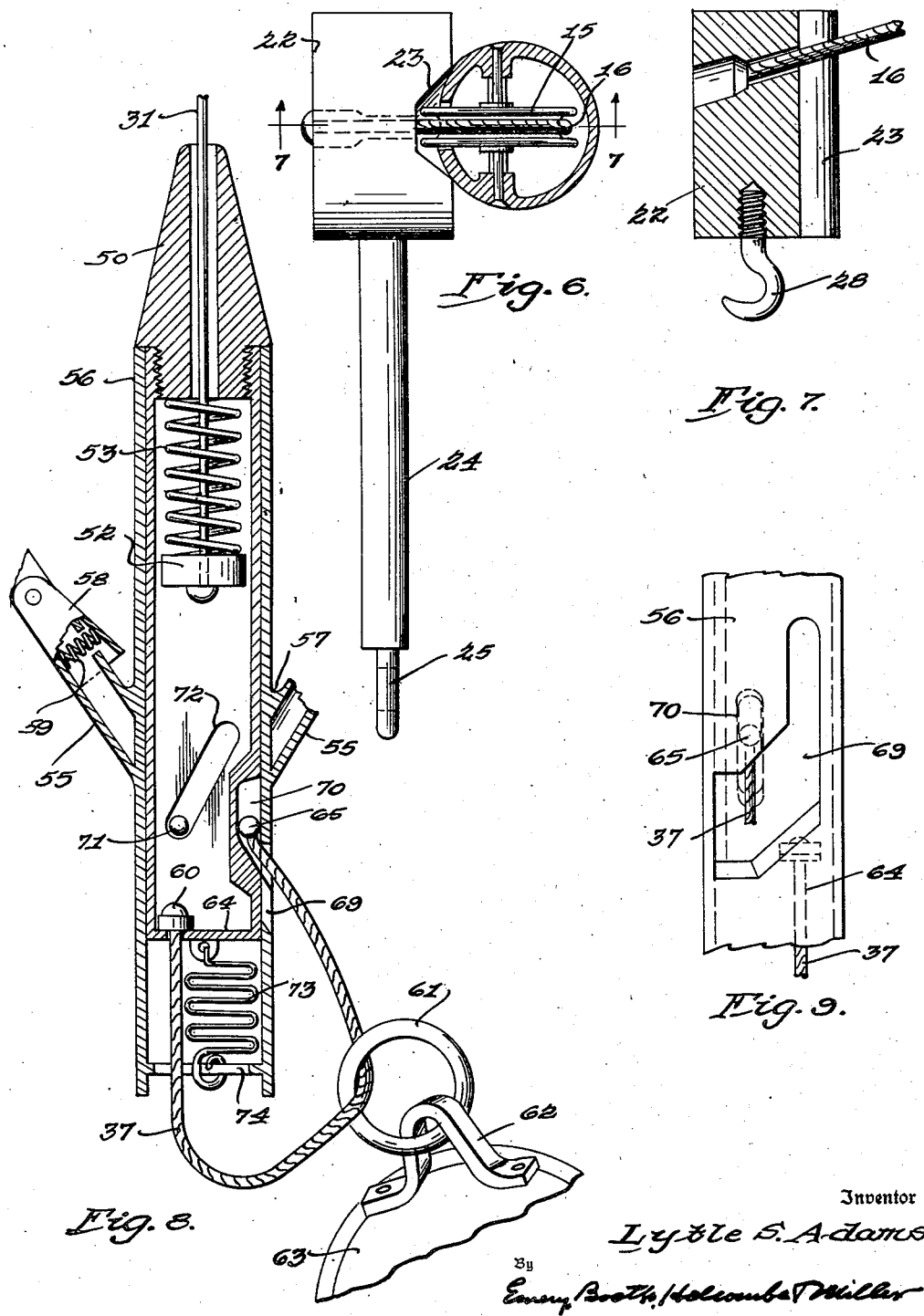
Inventor
Lytle S. Adams
By Emery Booth, Holcombe & Miller
His Attorneys Patented May 12, 1942

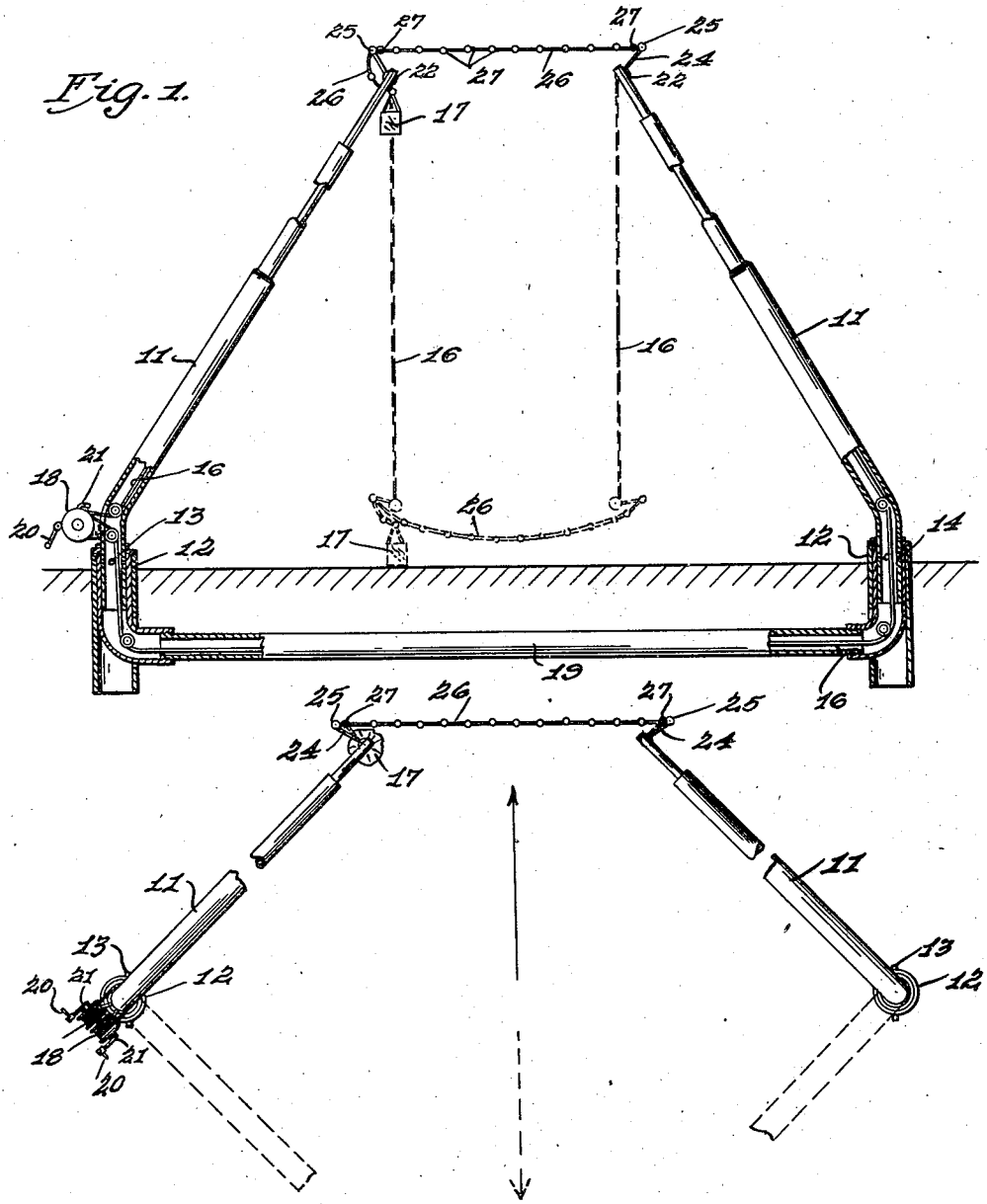

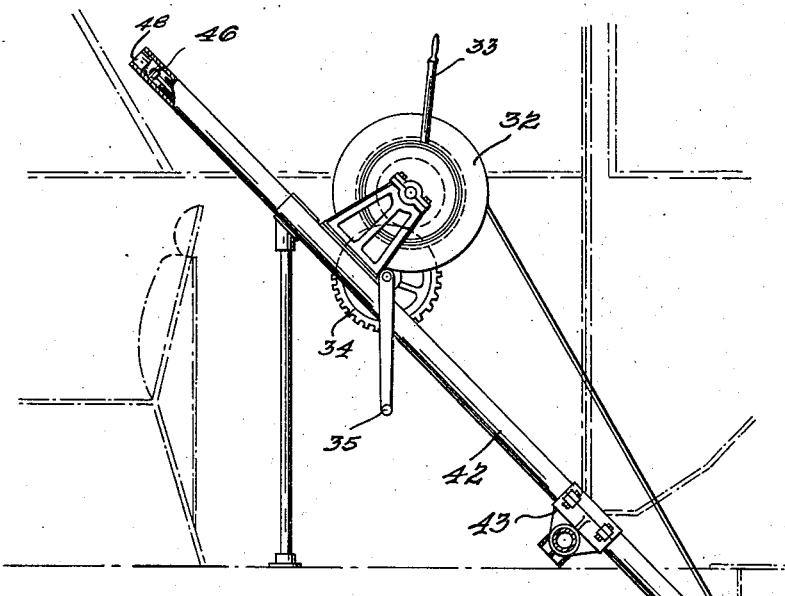
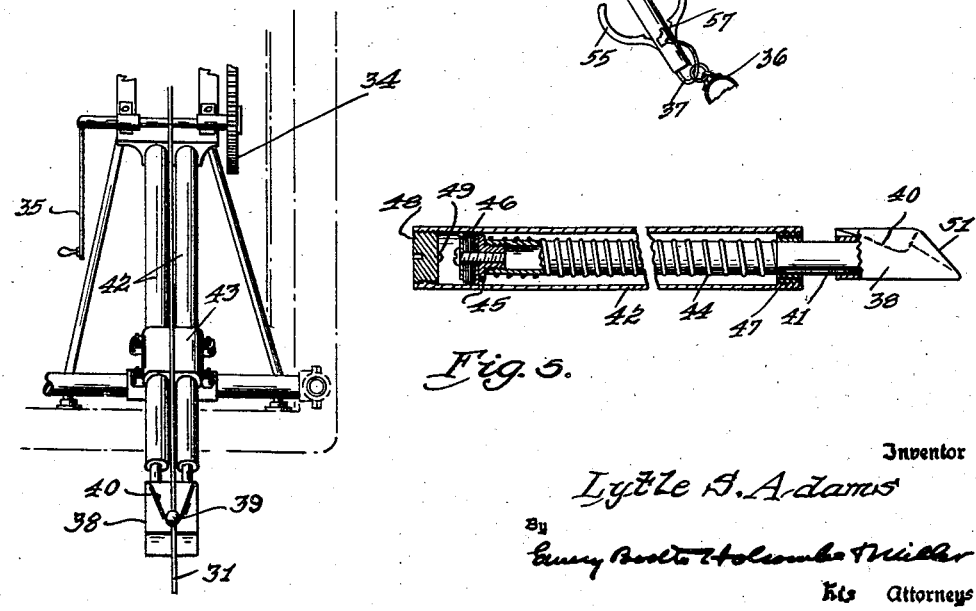

2,282,921

UNITED STATES PATENT OFFICE 2,282,921

AIRCRAFT PICKUP AND DELIVERY APPARATUS

Lytle S. Adams, Irwin, Pa., assignor to All American Aviation, Inc., a corporation of Delaware Application November 12, 1938, Serial No. 240,200

15 Claims. (Cl. 253—1)

This invention relates to aircraft pickup and delivery apparatus and comprises improvements in a combined grappling and releasing hook, and also in the ground apparatus and hoisting mechanism carried by the aircraft, for enabling loads to be simultaneously picked up and discharged without undue shock upon the aircraft and with minimum attention from the aircraft crew and ground attendant.

Other objects and advantages of the invention are the reduction of the length of the trailing cable and connections required for picking up the ascending load, increased certainty of operative contact between the grapple and ground apparatus, and higher safe flying speed.

The invention further aims to improve the functioning of the different parts of the apparatus, to reduce the wear and tear upon the parts most subject to injury, and to lessen the time and effort required to make ready for contact with the ground in the normal functioning of the apparatus.

In the illustrative embodiments of the invention shown in the accompanying drawings, Fig. 1 is a vertical elevation of a pair of launching masts showing a bag and pickup rope in position to be engaged by a grapple, the dotted lines indicating the bag and other parts before being hoisted from the ground;

Fig. 2 is a plan view of the same, the dotted lines indicating an alternative setting of the masts for an aircraft approaching from the opposite direction;

Fig. 3 is a longitudinal view through a portion of an aircraft, showing the hoisting reel in side elevation with the trailing cable and grapple paid out in normal position for delivering and picking up a load;

Fig. 4 is a rear elevation of a portion of the reel and shock absorbing mechanism, showing the cable guided in the stop block;

Fig. 5 is a longitudinal section through one of the shock absorbing cylinders, showing the cable guide and stop block in side elevation;

Fig. 6 is a cross-section through the upper end of a launching mast, showing a hoisting arm in side elevation;

Fig. 7 is a cross-section of the hoisting arm on the line 7—7 in Fig. 6;

Fig. 8 is an axial cross-section of a grapple, with the hooks broken off, showing the detachable connection for the descending bag in locked position to suspend a bag; and Fig. 9 is a side view of a portion of the grapple, showing the detachable connection in locking position.

The ground apparatus, as shown in Figs. 1 and 2, comprises two masts or supports 11, preferably hollow from end to end, pivoted at their bases in hollow posts 12, set in the ground about twenty to thirty feet apart, or embedded in concrete or otherwise firmly secured. The masts are bent or inclined at an oblique angle to bring their tops to within about ten feet of each other in the normal position of the masts, making an angle of about 45° to the line of flight of the aircraft, in whichever direction the craft is expected to pass, the masts being rotatable through an arc of 90° or so for this purpose, as shown in Fig. 2. Pins 13 are provided for securing the masts in the desired angular position with respect to the line of flight, these pins passing through alining holes 14 in the masts and posts, there being as many sets of holes as are needed for the different settings of the masts.

At the upper ends of the masts are pulleys 15 (see Fig. 6) over which run the hoist lines 16 for elevating the mail or express pouch 17 and launching devices from the ground where the parts are assembled. The hoist lines pass through the hollow masts to drums 18 upon which they may be wound simultaneously, the winding drums for convenience being located upon one of the masts and the hoist line to the other mast passing through a pipe 19 under the ground between the hollow posts 12. Suitable cranks 20 and ratchet devices 21 are provided for turning and holding the drums 18 to secure the launching devices and bag in elevated position.

Each of the hoist lines 16 is secured to a heavy base member 22, provided with a deep slot 23 across one face to engage the edge of the pulley 15 and adjacent side of the mast and hold it in definite angular position with respect thereto when hoisted as far as it will go, the point of attachment of the hoist line 16 to the base being near the upper end of this slot in the normal position of the launching devices ready for the aircraft to pick up the pouch. The bases 22 are made right and left hand and each base has an arm 24 projecting from its side in the direction away from the line of flight of the aircraft, at the extremity of which is a ring 25 for temporarily attaching the rope 26, preferably tied with a series of knots 27, and which is secured to the pouch 17 at one end. The temporary attachments to the arms 24 may be made with light string or other easily breakable form of tie. A second pouch may be secured to the other end of the rope 26 if desired, thereby dividing the weight to be raised. A hook 28, opening away from the slotted side of the base 22, is also provided for supporting the pouch after it leaves the ground until it is picked up by the passing aircraft, thus relieving most of the strain on the temporary fastenings for the ends of the rope 26.

The means for picking up the knotted rope 26 and its load is a grapple 30, trailed below the aircraft on a cable 31 which may be reeled in and paid out by means of a drum 32 mounted in the craft and controlled by a brake 33 and suitable reducing gearing 34 operated by a crank 35, as shown in Figs. 3 and 4. Normally the cable is wound on the drum with the grapple stowed inside the aircraft, but in preparing to deliver a pouch and pick up another the descending pouch 36 is attached to the grapple by a releasable tie 37 and the cable 31 is allowed to unwind until twenty-five to fifty feet have been paid out through the guide block 38 at which point a ball 39 fixed upon the cable, catches in the narrow part of the guide groove 40 and prevents further unwinding of the cable.

The guide block is secured on the lower ends of two parallel bars 41 which slide in long shock absorber tubes 42 mounted in the aircraft body to project through a trap or opening in its bottom, as shown in Fig. 3. Preferably the connection 43 between the shock absorber tubes and aircraft frame is adjustable to permit the tubes to be raised and lowered and to permit adjustment of the angle that the tubes and guide block make to the horizontal. Within the tubes 42 are compression springs 44 surrounding the bars 41 and each abutting against a flange 45 at the inner end thereof, so as to provide uniform resistance to the outward and downward movement of the bars and guide block when the grapple encounters an obstacle or hooks on to a pouch to be picked up. The upper ends of the bars 41 are fitted with plungers 46 and the lower ends of the tubes 42 are closed by guide sleeves 47 provided with small orifices for permitting air to escape slowly from the tube during the rapid movement of the guide rods, the trapped air assisting in cushioning the shock on the aircraft.

The upper ends of the tubes 42 are closed by adjustable screw plugs 48, as shown in Fig. 5, which may be adjusted to cover more or less completely the air vents 49 in the side of each tube near its extremity, thereby permitting the springs 44 to retract the bars 41 slowly after each downward movement thereof, and preventing violent recoil which might otherwise throw the grapple upward into the aircraft with sufficient force to do damage to some part of it. In bumpy air this shock absorber mechanism largely prevents irregular movements of the aircraft from whipping the grapple and attached pouch around in the air, and perhaps fouling some vital part of the structure or control mechanism.

The grapple 30 is provided with a conical point or tip 50 where it is attached to the cable 31 for permitting the latter to be reeled up until the grapple engages the guide block 38, whereupon the tip 50 slides upon the sloping lower face 51 of the guide block, lifting the cable out of the guide groove 40 and permitting the grapple and its load to be hoisted into the aircraft body. The lower end of the cable 31 within the hollow stem of the grapple is secured to a washer 52, and a compression spring 53 is interposed between this washer and the inner end of the point 50 to reduce the shock which would otherwise be transmitted to the cable and aircraft when the grapple encounters any fixed object.

The grapple is provided with a plurality of arms 55, four being shown in the illustrative example, welded or otherwise integrally secured upon a sliding sleeve 56, surrounding the tubular stem of the grapple. The arms make a sharp angle with this sleeve and are curved inwardly at their tips to approach the sleeve sufficiently to avoid digging into the ground or other fixed objects should the grapple scrape against them while being trailed from the moving aircraft. Between the arms and stem of the grapple are notches 57 shaped to grip and securely hold the pick-up rope 26. These notches may be integrally formed on the arms, as shown in Fig. 3, or they may be formed by spring pressed hoods 58 pinned on the arms and normally held in gripping position by springs 59, as shown in Fig. 8. The operation of the notches is the same in both forms of device, the rope jamming into a notch when it is engaged by the grapple and being retained there by friction of the parts until it is disengaged by pressing down the hood 58 or by forcibly withdrawing it from the notch.

The pouch 36 to be delivered is detachably secured to the lower end of the grapple by means of the short tie or flexible connection 37 looped through a ring 61 which passes through a heavy strap 62 or other fitting rivetted to the fiber nose protector 63 of the pouch, which is preferably streamlined to reduce the resistance of the air to its passage through it. One end of the flexible tie connection 60 is passed through the open lower end of the sleeve 56 and is secured to the lower end 64 of the main stem of the grapple. The free end of the tie is provided with an enlargement, such as the steel ball 65, as shown in Fig. 8, which may be inserted through an opening 69 in the sleeve 56 into a notch 70 in the side of the main stem when the outer sleeve 56 is rotated sufficiently to expose it.

The inner stem and outer sleeve 56 are connected by a pin 71 in the inner stem sliding in an inclined slot 72 in the outer sleeve, so as to cause simultaneous rotation and lengthwise sliding movement of the sleeve on the stem when the sleeve is pulled down, as by the grapple engaging a pickup rope or other object offering resistance to its forward movement. The spring 73, one end of which is secured to the end 64 of the inner stem and the other end is secured to a bar 74 across the lower end of the sleeve 56, normally retains the outer sleeve 56 in its uppermost position on the inner stem to hold the ball 65 in the notch 70, as shown in Figs. 8 and 9.

The operation of the launching device and grapple to deliver one pouch and pick up another is entirely automatic after the parts are set in position for making contact, as illustrated in Figs. 1, 2 and 3. As the aircraft passes rapidly over the stretched rope 26 with the trailing cable 31 paid out to the stop position and the pouch 36 suspended behind the grapple, unless the craft is very nearly over the mid-line of the ground apparatus the cable will contact with one or the other of the inclined masts 11 and slide along the mast to its extremity, where it will slip off and engage the knotted pick-up rope 26, breaking it away from the adjacent arms 24 and causing the free end to wrap around the cable forming a bight or loop through which the cable slides until the grapple engages the bight and the rope jams into one of the notches 57 and is carried along with the attached pouch 17 trailing behind.

Upon the impact of the rope with the arm 55 of the grapple, the outer sleeve thereof will be pulled down or to the rear with the reference to the stem of the grapple and caused to rotate sufficiently thereon to expose the ball 65, permitting it to escape from the recess 70, thereby freeing the end of the tie 37 and freeing the descending pouch 36, which falls to the ground almost at the same instant that the forward movement of the grapple straightens out the slack in the pickup rope and pulls the pouch off from the hook 28, the knots 27 insuring that the rope does not slip through the notch in which it is caught. The entire operation proceeds so swiftly that one pouch is entirely free from the grapple before the other is hooked on, and the drag on the cable is maintained almost without interruption, although increased momentarily until the picked up pouch has attained the speed of the aircraft, this increased drag being absorbed by the springs 44 in the shock absorber tubes without putting undue strain on any part of the apparatus.

The apparatus functions equally well for picking up a pouch without delivering another, and for delivering a pouch without picking up another, in the latter case a knotted rope with no pouch being stretched across from one launching arm 24 to the other and fastened temporarily just as though a pouch were attached to it. The heavy base blocks 22 are of sufficient weight to pull the hoist lines 16 down to the ground when the winding drums 18 are released, thus expediting the resetting of the launching apparatus.

My invention does away with the long pickup loop heretofore required with such system, and also permits of the aircraft staying from forty to fifty feet above the ground without trailing more than fifty feet or so of cable behind it, thereby avoiding danger to the aircraft from more closely approaching the ground in places not suitable for landing and taking off, and also avoiding danger from a longer length of trailing cable which might be difficult to reel in fast enough to avoid fouling obstacles surrounding a small field or short runway otherwise suitable for pickup and delivery purposes.

I claim the following as my invention:

1. Aircraft apparatus for picking up articles comprising an aircraft, a trailing cable suspended from the air-craft, said cable being connected to the stem of a grapple having a plurality of arms making less than a right angle to the stem of the grapple above their points of attachment thereto, and holding means presenting a restricted opening between the arm and stem adapted to receive and hold a rope, comprising sheet metal hoods each embracing the upper side of the adjacent arm and hinged thereto at its end remote from said stem, and spring means for normally holding the free end of said holding means away from the arm upon which it is pivoted and in proximity to said stem.

2. A grapple for automatically delivering articles from moving aircraft comprising a stem, contact members mounted thereon for movement relative thereto, and a flexible tie member for attaching the article to be delivered, said tie member being provided with connections to said stem at both its ends, one only of said connections being quickly detachable, and means connected with said movable contact members for releasing said detachable connection, said means including a rotatable sleeve, and a spring for restraining said sleeve against rotation, whereby said means are unaffected by the load on said tie member.

3. A grapple for automatically delivering articles from moving aircraft comprising a hollow body adapted to be secured to a trailing cable at one end and provided with a flexible tie member adapted to form a loop for supporting the article to be delivered at the other end, said tie member being connected to said body at one end and having its other end free therefrom, a recess in said body for receiving the free end of said tie member, means slidably disposed on said hollow body for contacting a ropelike tripping element, said slidable means normally overlying said recess to retain the end of the tie member positioned therein, and means for normally restraining said slidable means from moving so as to uncover said recess sufficiently to permit said tie member to be withdrawn therefrom.

4. A grapple of the type described in claim 3 having arms on the slidable contact means provided with notches to embrace and hold the ropelike tripping element.

5. A grapple for automatically delivering articles from moving aircraft comprising a hollow body adapted to be secured to a trailing cable at one end and provided with a flexible tie member for supporting the article to be delivered at the other end, a recess in said body for receiving one end of said tie member, means slidably and rotatably disposed on said hollow body for contacting a rope-like tripping element, said contacting means having a portion normally overlying said recess to retain the end of the tie member positioned therein, and means for normally restraining said contacting means from moving so as to uncover said recess sufficiently to permit said tie member to be withdrawn therefrom, said contacting means and hollow body being connected by means providing for simultaneous sliding and rotating movement upon the impact of the former against a ropelike body while the latter is being trailed from an aircraft.

6. Aircraft pickup and delivery apparatus comprising a trailing cable and means for hauling it into the aircraft, a cable guide mounted on the aircraft having a notch, an enlargement on said movable cable adapted to seat in said notch to prevent said cable from running out, a resilient support for said guide, anti-recoil means for said support and guide, said resilient support and anti-recoil means operating to control the movement of said cable when seated in said notch, a grapple on the trailing end of said cable, said grapple comprising a body having contact members movably mounted thereon and a releasable tie for securing an article to be delivered, restraining means between said body and contact members permitting a direct shock on said contact members to move them relatively to said body and release said tie, said resilient support, anti-recoil means and restraining means being adjusted to prevent pitching of the craft from whipping said grapple sufficiently to release said tie while permitting a slight impedance of the forward movement of the contact members to release said tie.

7. Aircraft pickup and delivery apparatus comprising a trailing cable and means for hauling it into the aircraft, a movable cable guide mounted on the aircraft having a stop, means on said cable for engaging said stop to prevent the cable from running out, a resilient support for said guide and anti-recoil means for said support and guide, said resilient support and anti-recoil means operating to control the movement of said cable when seated in said notch, a grapple on the trailing end of said cable, said grapple comprising a body having contact arms movably mounted thereon and a detachable support for an article to be delivered, means associated with said arms for engaging and securely holding a rope-like support for an article to be picked up, means associated with said arms for releasing said detachable support when they engage a support for an article to be picked up, whereby the weight of the picked up article approximately makes up for the weight of the to be delivered article as one is engaged and the other is released, and momentary changes in the pull on the trailing cable are compensated for by the resilient support and anti-recoil means.

8. Aircraft apparatus for picking up articles comprising a trailing cable suspended from the aircraft provided with a grapple near its extremity, spaced supports for spreading a rope across the path of flight of the aircraft, the extremities of said supports being inclined toward the line of flight and turned away from the direction of flight at an angle thereto of less than 90° to form upwardly converging guide portions for said cable and grapple approaching along the line of flight, outwardly splayed spreaders detachably connected to the extremities of said supports, and a rope stretched between said spreaders and extending laterally to each side of the line of flight beyond the ends of the guide portions of said supports, thereby protecting the ends of the rope from contact with said cable.

9. Supports as described in claim 8 consisting of hollow masts having their extremities provided with pulleys and hoist lines housed within the masts and passing over said pulleys, openings in the sides of said masts opposite said pulleys and remote from the line of flight, through which openings the hoist lines emerge to which said spreaders are attached for detachably holding the rope spread completely across the space between the extremities of said masts and to each side thereof, whereby said hoist lines, pulleys and spreaders are protected from contact with said cable.

10. Supports as described in claim 8 consisting of hollow masts having their extremities provided with pulleys and hoist lines housed within the masts and passing over said pulleys, openings in the sides of said masts opposite said pulleys and remote from the line of flight, through which openings the hoist lines emerge, said spreaders being attached to said hoist lines and having alining grooves in their base portions for engaging fixed parts of said masts adjacent said openings to maintain said spreaders in widespread alinement with said rope.

11. Aircraft apparatus for picking up articles comprising an aircraft, a trailing cable suspended from the aircraft, said cable being connected to the stem of a grapple having a plurality of arms making less than a right angle to the stem of the grapple above their points of attachment thereto, and detents pivoted to said arms at intermediate points above said points of attachment, said detents having their free ends extending toward and spaced from said stem to provide notch-like restricted spaces between said detents, arms and stem adapted to receive and hold a rope, in combination with ground supported apparatus comprising a short rope stretched across the path of flight of said aircraft to which rope an article may be attached.

12. Aircraft apparatus for picking up articles comprising an aircraft, a trailing cable suspended from the aircraft, said cable being connected to the stem of a grapple having a plurality of arms making less than a right angle to the stem of the grapple above their points of attachment thereto, and shields embracing and attached to the arms adjacent to said points of attachment and each spaced therefrom to present a restricted opening between the arm and stem adapted to receive and hold a rope, the outer ends of said arms being bent upward and inward towards said stem and terminating at points spaced therefrom sufficiently not to interfere with the passage of a rope transversely disposed with respect to the direction of movement of said grapple, whereby entanglement of said arms with large objects is prevented.

13. Aircraft apparatus for picking up articles comprising an aircraft, a trailing cable suspended from the aircraft, said cable being connected to the stem of a grapple having a plurality of arms making less than a right angle to the stem of the grapple above their points of attachment thereto, and movable shields attached to said arms adjacent to said stem, and each presenting in one of its positions a restricted opening between the arm to which it is attached and said stem adapted to prevent escape of a rope engaged therein, in combination with spaced supports for spreading a rope across the line of flight of said aircraft and a rope detachably supported thereby in position to be engaged by said grapple.

14. Aircraft apparatus for picking up articles comprising an aircraft, a trailing cable suspended from the aircraft, said cable being connected to the stem of a grapple having a plurality of arms making less than a right angle to the stem of the grapple above their points of attachment thereto, and shields attached to said arms adjacent to said stem, and each presenting a restricted opening between the arm to which it is attached and said stem adapted to prevent escape of a rope engaged therein, in combination with spaced supports for spreading a rope across the line of flight of said aircraft and a rope detachably supported thereby in position to be engaged by said grapple, said rope having enlargements adjacent its ends.

15. Aircraft article pickup apparatus as described in claim 14 comprising a rope provided with enlargements intermediate and adjacent its ends.

LYTLE S. ADAMS.